April 23, 1940.                L. R. KIRKWOOD ET AL                2,197,933
                                MUTING CONTROL SYSTEM
                                 Filed Nov. 30, 1938
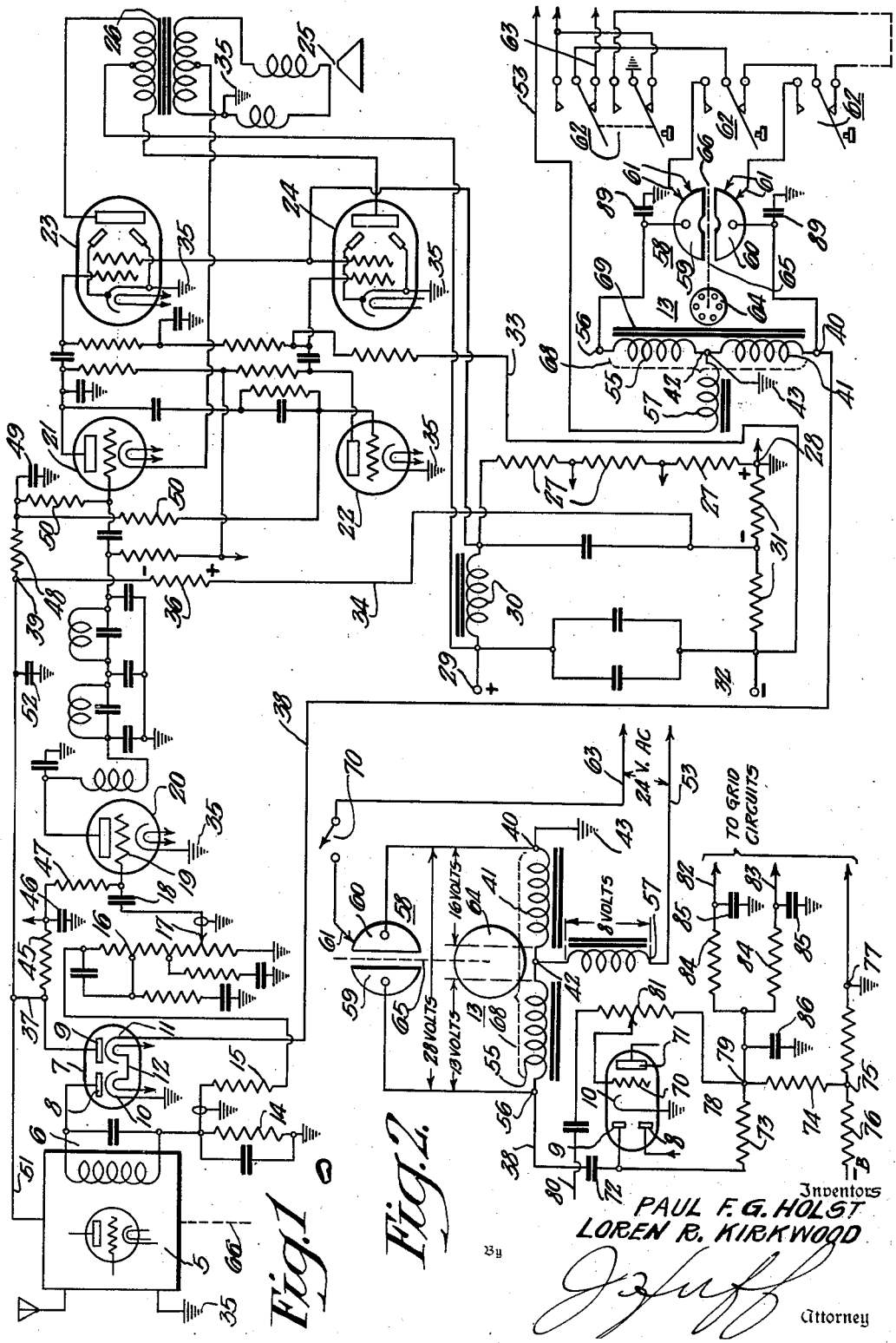
Inventors
PAUL F. G. HOLST
LOREN R. KIRKWOOD
Attorney Patented Apr. 23, 1940

2,197,933

UNITED STATES PATENT OFFICE 2,197,933

MUTING CONTROL SYSTEM

Loren R. Kirkwood and Paul F. G. Holst, Oaklyn, N. J., assignors to Radio Corporation of America, a corporation of Delaware Application November 30, 1938, Serial No. 243,115

5 Claims. (Cl. 250—20)

The present invention relates to a muting control system for radio receiving apparatus and the like, operative to cut off the signal output in response to operation of the tuning means, and more particularly it relates to a system of the type referred to having electric motor tuning control means from which biasing potentials for certain of the signal amplifying tubes are derived for cutting off the signal output when the motor means is energized.

It is an object of the present invention to provide an improved muting control system for radio receiving apparatus and the like having electric motor tuning means that operates to utilize voltages available within the said motor means, without additional windings thereon heretofore considered necessary for providing a muting potential source.

It is also a further object of the present invention to provide a muting control system of the type referred to for use in connection with electric motor tuning means having a reversible electric motor provided with operating windings arranged to utilize the transformer action of the windings when supplied with alternating current, thereby to provide a higher muting potential than has heretofore been available in systems of this character.

In muting control systems heretofore known, a separate winding applied to an alternating current tuning motor, is utilized as a potential source from which a D. C. biasing potential is derived through a rectifier and utilized to control certain of the amplifier tubes in the receiving system in such degree and polarity as to bias the tubes substantially to cut off, thereby preventing undesired signal output from the receiving system as the system is tuned from one signal channel or broadcasting station to another by operation of the motor.

With modern receiving tubes, the biasing potential required to cut off the signal flow therethrough may be relatively high. By utilizing the transformer action of the motor windings, the necessity for an additional winding on the motor as a voltage source may be obviated and at the same time a relatively high and effective muting potential may be obtained.

The invention will, however, be better understood from the following description when considered in connection with the accompanying drawing and its scope will be pointed out in the appended claims.

In the drawing:

Figure 1 is a schematic circuit diagram of a radio receiving system provided with a muting control system and electric motor tuning means embodying the invention; and Figure 2 is a similar schematic circuit diagram showing a modification of the invention.

Referring to Fig. 1, the radio receiving system includes the usual tuning means indicated at 5 having an output circuit 6 connected with a detector tube 7 which may be considered as the second detector of a superheterodyne receiver and for that purpose is of the diode rectifier type.

The detector 7 may be provided by a tube such as an RCA 6H6 tube having two anodes 8 and 9 and two cathodes 10 and 11 provided with a heater element 12. One of the rectifier elements 8—10 is utilized as the second detector, while the other rectifier element 9—11 is utilized as the muting rectifier through which a direct current biasing potential is derived from the alternating current motor indicated at 13, as will hereinafter be described.

The detector 8—10 is coupled to the audio frequency amplifier in any suitable manner such as by an output resistor 14 connected through a resistor 15 to a volume control potentiometer 16—17 in turn coupled through a capacitor 18 with the control grid 19 of the first audio frequency amplifier 20.

The audio frequency amplifier following the first amplifier tube 20 includes a driver tube 21 suitably coupled to the first stage amplifier 20 and a push-pull power output stage comprising power amplifier tubes 23 and 24 coupled respectively to the driver tube 21 and to a phase inverter tube 22. The signal output from the receiver is applied to a loudspeaker indicated at 25 through an output coupling transformer 26.

Power supply for the radio receiver is taken from the usual bleeder circuit adapted to be connected with any suitable rectifier, which has been omitted for the sake of simplifying the drawing, and comprising plate supply resistors 27 connected between ground 28 and the positive terminal 29 in series with the field winding 30 of the loudspeaker, and bias supply resistors 31 connected between ground and the negative supply terminal 32 for the bleeder circuit.

The output tubes 23 and 24 receive fixed biasing potential through a bias supply lead 33 from the bias supply resistors 31. The amplifier tubes 20, 21 and 22 and other suitable amplifying tubes in the signal channel receive a fixed biasing potential from the source 31 through a bias supply lead 34 and the ground connection 28 to which all of the cathodes are connected, as indicated at 35, the cathode of the tube 21 being connected through the secondary of the output transformer 26 to provide inverse feedback. The bias supply circuit continuing with the lead 34 may be traced through a diode output resistor or muting potential supply source 36, thence through a diode anode connection lead 37 to the muting diode anode 9, with which is associated the cathode 11, having a cathode lead 38 connected back to a terminal 40 of the motor 13 in connection with a winding 41, the opposite terminal 42 of which is connected to ground, as indicated at 43. When the motor winding is energized, current flows from the terminal 42 on the positive half waves through the resistor 31 by way of ground, thence through the bias supply lead 34, the diode output resistor 36 to the anode lead 37, through the rectifier 9—11 and back through the lead 38 to the terminal 40 of the supply winding 41.

The voltage drop set up in the resistor 36 is in aiding relation to the potential drop at 31 causing the lead 37 to become more negative with respect to ground, and, in this manner, the negative bias on the tubes 20, 21 and 22, together with such additional tubes as may be desired, is increased from the fixed bias initially provided by the source 31 to such value that the tubes control thereby are biased substantially to cut-off, thereby preventing the flow of signals through the signal channel of the receiver when the motor winding is energized.

The tubes are provided with suitable filter connections with the negative supply lead 37, as indicated by the filter resistor 45 and capacitor 46, in circuit with the lead 19 through the grid resistor 47, and by the filter resistor 48 and capacitor 49, in connection with the grid resistors 50, or the tubes 21 and 22. Biasing potentials may be supplied to certain of the amplifier tubes in the RF or preferably IF amplifiers included in the tuning system 5, as indicated by the connection lead 51. The rectifier output resistor 36 is provided with a suitable bypass capacitor indicated at 52.

As hereinbefore referred to, the motor is of the reversible type and the time constants of the bias supply system as provided by the filters 45—46 and 48—49, together with the bypass capacitor 52, are such that a sufficient delay is provided in response to voltage which is set up across the resistor 36 that normal reversals of the motor do not remove the additional potential for silencing the receiving system until the tuning has been completed. The time constant of the bias supply circuit is also such that hum from the motor circuit is not introduced into circuits not silenced, and, in order that the wave front of the voltage applied to the circuit from the motor may be smoothed sufficiently to prevent the surge from being transmitted through the amplifier to the output circuit of the reproducing device.

In the present example, the motor 13 is made reversible by two windings, one of which is the winding 41 already referred to, and the other of which is a similar winding indicated at 55, connected with the terminal 42 and having an input terminal 56 at the outer end thereof. The motor is further provided with a main operating winding 57 through which alternating current is supplied from a supply lead 53 to the terminal 42 common to all of the windings. Current then flows from the terminal 42 through the one or the other of the reversing windings 41 and 55 under control of a commutator device 58 having one segment 59 connected with the terminal 56 and another segment 60 connected with the terminal 40. The circuit is completed from the commutator device 58 through adjustable contacts 61 operating thereon and push-button selector switches 62 to an alternating current supply lead 63. The motor armature indicated at 64 is connected with the commutator device 58, as indicated by the connection 65, and actuates the tuning control device through a connection indicated at 66 in any suitable manner. As the tuning control device does not form part of the present invention, further description is believed to be unnecessary, as any suitable motor may be utilized having windings 41 and 55 which may be energized selectively in common with an operating winding 57, and being further associated on the motor in such manner that they are coupled electromagnetically, as indicated by the dotted bracket 68. For this purpose, they may be mounted on the same core indicated at 69.

With the arrangement indicated, when alternating current flows from the leads 63 through the switches 62 and one of the contacts 61 to the segment 59 and terminal 56, the winding 55, together with the winding 57, is energized by the circuit, which is completed through said windings to the supply lead 53. The current through the winding 55 induces a voltage in the winding 41 coupled therewith and causes the muting system to be actuated at substantially the same potential as when the motor circuit is completed from the supply lead 63, switch 62 and a contact 61 to the segment 60 and terminal 40, at which time the current flows through the winding 41 and the winding 57 to the supply lead 53, causing the motor to reverse. With a supply potential of 24 volts, the winding 41 provides a potential drop of substantially 16 volts, when directly energized as above described, and a voltage of approximately 13 volts, when voltage is induced therein from the winding 55. Thus, the voltage applied to the rectifier 9—11 and the muting potential is substantially the same for the operation of the motor in either direction, while the connection therewith remains permanent across one winding in the motor operating circuit. Thus, no additional winding is required for providing the muting potential to be rectified.

The transformer action of the windings 55 and 41 may also be utilized to provide the full voltage of the alternating current supply and to increase that voltage for application to the muting rectifier, as shown in the circuit of Fig. 2, to which attention is now directed and in which like parts, as in Fig. 1, bear the same reference numerals.

Referring to Fig. 2, the alternating current supply lead 53 is connected through the main operating winding 57 of the motor to the common terminal 42, and the two reversing windings 41 and 55 are connected with the reversing commutator device 58, as in the preceding figure. A single selector contact 61 and a single switch 70 are provided in connection with the supply lead 63, in order to simplify the drawing, the switch 70 being representative of any of the switches 62 of the circuit of Fig. 1, for the purpose of closing the motor circuit through the commutator device and one of the reversing windings.

In Fig. 2, however, the winding terminal 40 is connected to ground 43, while the center tap 42 between the windings 41 and 55 is not grounded. This circuit causes the full potential across both windings to be applied between ground and the rectifier output lead 38 for use in connection with the muting rectifier.

The voltages across the windings 41 and 55 add vectorially to equal 28 volts, as the sum of 16 and 13 volts available across the windings.

The windings being energized, such as either of the reversing windings, and the main winding 57 receive a total of 24 volts, as indicated, of which 8 volts are utilized in the common winding 57 and 16 volts in the reversing winding. The voltage induced by transformer action in the remaining reversing winding is substantially 13 volts, as indicated.

In this system, when the winding 55 is energized, the drop across it is 16 volts, and the voltage induced in the winding 41 is 13 volts. By thus utilizing the transformer action of the reversing windings, one upon the other, and providing a series circuit between them, across which the muting rectifier circuit may be connected, an even higher voltage than the supply voltage may be obtained for muting purposes.

In this circuit also the detector anode 8 and the muting rectifier anode 9 are provided with a common cathode 10 connected to ground, as in the circuit of Fig. 1, and the cathode also serves as one of the elements of a triode comprising a control grid 70 and an output anode 71 utilized as the first audio frequency amplifier. With the cathode connected to ground for the muting rectifier anode 9, a change in the circuit from that of Fig. 1 is required, because of the ground connection. In this case, the anode 9 is coupled through a capacitor 72 with one of the terminals 56 of the series-connected reversing windings of the motor, the other terminal 40 being grounded. The anode is also connected through a filter resistor 73 and an output resistor 74 to a tap point 75 on a supply bleeder resistor 76 in the negative supply lead, whereby the point 75 is below ground 77 by a predetermined fixed potential. Since the cathode 10 is also connected to ground, a connection 78 for the control grid 70 at a terminal 79 provides a fixed biasing potential on the grid 70, which is caused to become more negative as the motor is energized and the potential is received across the resistor 74. This control grid also receives audio frequency signals through an input lead 80 and a volume control potential device 81. Biasing potentials for other grid circuits on which muting control is to be applied are taken through supply leads indicated at 82 and 83, in which are placed suitable filters comprising series resistors 84 and bypass capacitors 85 providing a predetermined time constant for the circuits. The resistor 74 is also provided with a bypass capacitor 86 which cooperates with the other capacitors to provide the desired time constant in the operation of the muting system, whereby the muting is applied rapidly in response to energizing of the motor but is delayed in releasing for an appreciable time, such as ¼ to ¾ seconds, in order that reversals of the motor may not remove the muting and in order that the receiving system may remain muted until a desired signal is fully tuned in.

As will be seen from a consideration of the filters, the filter capacitors are connected at the grid ends of the filter resistors or impedances so that, when a predetermined charge is applied to the filter capacitors, the receiver is silenced, and that the rectifier and circuit connection with the filter circuits provides means responsive to the energization of the motor for charging the filter capacitors to said predetermined charge. The discharge will then occur over a predetermined time interval.

The circuit of Fig. 1 also has the advantage that the center point 42 of the windings may be grounded and that each of the terminals 40 and 56 may also be grounded through suitable bypass capacitors, as indicated at 89.

The advantage of the circuit of Fig. 2 over that of Fig. 1 lies in the fact that both of the reversing windings are utilized in the series to provide the muting voltage and the voltage supplied for muting purposes is the same for either direction of rotation of the motor. Furthermore, the voltage supplied may be the maximum available for the entire motor and may be even higher than that supplied for the motor. In the circuit of Fig. 1, however, the same motor winding is utilized for the supply of muting potential, and when energized directly, the voltage is slightly higher than when energized by the transformer action.

Either system provides a simple means for obtaining voltage of a sufficiently high value for silencing or muting purposes in conjunction with modern amplifying tubes, without resorting to additional windings on the motor and without interfering with the operation of the motor in either direction.

We claim as our invention:

1. The combination with radio signal tuning and amplifying means, of means for impairing the signal transmitting efficiency of said amplifying means in response to a controlling potential, an electric tuning motor for said first-named means having a pair of reversing windings inductively coupled for the transfer of energy therebetween and series-connected to provide voltages in aiding relation, and a potential supply circuit connected between at least one of said windings and said amplifying means for supplying thereto said controlling potential when either of said windings is energized.

2. The combination with radio signal tuning and amplifying means, of means for impairing the signal transmitting efficiency of said amplifying means in response to a controlling potential, an electric tuning motor for said first-named means having a pair of reversing windings inductively coupled and series-connected to provide voltages in aiding relation, means for selectively energizing either of said windings whereby a voltage is induced in the other, and a potential supply circuit connected between at least one of said windings and said amplifying means for supplying thereto said controlling potential, said circuit including a rectifier device and a filter network providing a predetermined time constant.

3. A radio muting control system comprising the combination with tuning means and amplifying means, of a rectifier circuit for applying a biasing potential to said amplifying means to bias the same substantially to cut-off, a reversible electric motor for actuating said tuning means having two reversing windings inductively coupled for the transfer of energy therebetween, and means providing a connection for said rectifier circuit with at least one of said windings for energizing said circuit when either of said windings is energized to operate the motor in either direction.

4. A radio muting control system comprising the combination with tuning means and amplifying means, of a rectifier circuit for applying a biasing potential to said amplifying means to bias the same substantially to cut-off, a reversible electric motor for actuating said tuning means having two reversing windings inductively coupled, and means providing a connection for said rectifier circuit across both of said windings in series, whereby said circuit is subjected to the vector sum of the voltages in said windings when the motor is operated in either direction.

5. A radio muting control system comprising the combination with tuning means and amplifying means, of a rectifier circuit for applying a biasing potential to said amplifying means to bias the same substantially to cut-off, a reversible electric motor for actuating said tuning means having two reversing windings inductively coupled, whereby the transformer action of said windings is effective to provide induced voltages from one to the other, means providing a connection for said rectifier circuit with at least one of said windings for energizing said circuit when the motor is energized to operate in either direction, a plurality of amplifying tubes in said amplifying means connected in cascade relation to each other to provide a signal amplifying channel in connection with said tuning means, said amplifying tubes having a control grid biasing connection with said amplifier circuit, and filter means in said last named connection providing a time delay for preventing normal reversals of the motor from removing the said biasing potential from said tubes until the tuning operation of said system has been completed.

LOREN R. KIRKWOOD.
PAUL F. G. HOLST.